July 9, 1957 R. KAULEN 2,798,629
METHOD OF AND DEVICE FOR MOUNTING FLEXIBLE ASSEMBLING
FORMS ON PRINTING CYLINDERS
Filed May 28, 1954
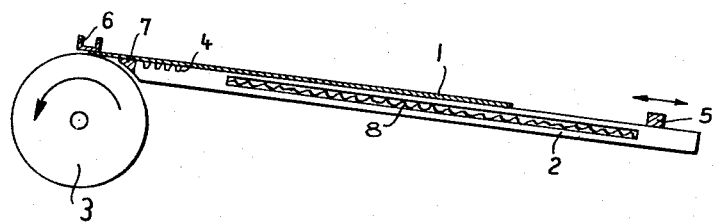
INVENTOR:
Robert Kaulen
By Bryant & Lowry
ATTYS.

United States Patent Office 2,798,629
Patented July 9, 1957

2,798,629

METHOD OF AND DEVICE FOR MOUNTING FLEXIBLE ASSEMBLING FORMS ON PRINTING CYLINDERS

Robert Kaulen, Lovenich, near Koln, Germany

Application May 28, 1954, Serial No. 433,245

Claims priority, application Germany June 1, 1953

4 Claims. (Cl. 216—9)

This invention relates to a method of and a device for mounting flexible assembling forms, especially flexible foils of artificial material, on printing cylinders.

To subsequently obtain the transfer of pictures by direct copying by the use of films on printing cylinders for copper plate printing which are covered with a layer sensitive to light, such is effected with repeating patterns as, for instance, in printing the outside of packings, folded boxes or the like either by repeated copying of the single patterns immediately on the printing form, or by passing a glass plate upon which the patterns are affixed, or by laying down a pattern obtained previously by addition and corresponding in size to that of the whole printing cylinder. The same way may be followed in printing illustrated journals or the like, in which case the pictures to be copied—with the text and eventually also without text—are assembled on a flexible foil of artificial material corresponding in size to that of the cylinder.

For such foils of artificial material Celluloid is used, preferably an artificial material on the base of a glass-clear transparent synthetic polymer containing polyvinyl chloride which is known under the registered trademark Astralon. This artificial material offers the advantage that it is not subjected to atmospheric influences and therefore does not warp. For this reason such foils of artificial material are frequently used for the transfer of pictures by direct copying on the printing cylinder, especially in multicolor printing. But this material presents the objection that it is charged electrostatically very easily and for this reason attracts dust and other impurities from the air. It is further necessary for unobjectionable operation that the assembling form comes into contact with the cylinder parallel to the axis thereof to prevent subsequent displacement. The removal of dust or other foreign matter may cause a displacement of the pattern whereby the coincidence of the colors with one another in printing is not assured.

According to the present invention, these objections are overcome. The essential feature of the invention provides that the surface of the assembling form coming into contact with the printing cylinder is carried over a suction device adjacent to the contacting place with the cylinder for the purpose of removing foreign matter, dust or the like. Further, the lower surface of the assembling form is subjected to drying by the influence of heat to be sure at all times that the assembling form is brought onto the cylinder in a dry state even in moist weather. According to a further feature of the invention provision is made that the moisture which eventually has to be removed from the foils or the like may actually escape. This is obtained in connection with the suction for removal of dust. Suction is effected suitably by the arrangement of channels or grooves on the table support which are connected with a low pressure or vacuum device. Simultaneously, some dust on the cylinder may be removed in laying down the assembling form so that a clean copy is assured.

The drawing shows diagrammatically an improved device for carrying out the method according to the invention.

The assembling form 1 is placed upon an even, preferably inclined table support 2 which is firmly connected with the frame upon which rests the cylinder to be copied. In this support are provided as near as possible to the cylinder one or more channels or grooves 4 extending transversely to the direction of displacement of the assembling form. At the lower end of the table support 2 is provided a band 5 extending parallel to the axis of the cylinder and serving as a rest when laying down the assembling form. This band is adjustable as the width of the assembling form varies in accordance with the circumference of the printing cylinder to be treated.

After applying the assembling form to the table support, the form is connected at both sides with the cylinder, as, for instance, by adhesive tape. If thereafter the cylinder is rotated in such a direction that the assembling form is drawn towards the cylinder and if simultaneously the air is sucked off from channels 4, each dust particle is sucked off from the assembling form. By a wiping device 6 of leather or the like arranged adjacent to the channels, any foreign matter adhering to the assembling form is retained, thereby simultaneously wiping the cylinder. Suction is carried out during laying down the assembling form, suitably in such a manner that the upper edge of the assembling form is applied within the range of the channels of the table support 2 and only thereafter this edge is moved towards the cylinder. The front edge of table 2 is suitably provided with a further wiper 7 which simultaneously cleans the cylinder 3.

Eventually the moisture present is removed on the one hand by a heating device 8 arranged with table support 2 and on the other hand by sucking off from the channels. Channels connected with a lower pressure device may also be provided at another place as, for instance, in the middle of the table support.

What is claimed as new, is:

1. Means for mounting flexible assembling forms, especially flexible foils of artificial material serving as patterns on intaglio printing copper cylinders comprising a table support adapted to support an assembling form over the entire area of the form, a printing cylinder adjacent the forward end of the table support to receive the assembling form, the upper surface of the table support adjacent the cylinder having a plurality of transverse channels at its upper side facing the assembling form and in which channels a low pressure is maintained for rendering the artificial material antistatic and for the removal of foreign matter, dust and the like from the face of the assembling form prior to wrapping around the cylinder.

2. Means as in claim 1, wherein the table support is provided with a heating device embedded therein to dry the lower surface of the assembling form.

3. Means as in claim 1, wherein a wiper is carried by the front terminal end of the table support in position to clean the lower surface of the assembling form and the cylinder.

4. Means as in claim 2, wherein a wiper is carried by the front terminal end of the table support in position to clean the lower surface of the assembling form and the cylinder.

References Cited in the file of this patent

UNITED STATES PATENTS

| | | |
|---|---|---|
| 641,311 | MacLean | Jan. 16, 1900 |
| 1,543,297 | Robinson | June 23, 1925 |
| 2,113,655 | Kellie | Apr. 12, 1938 |
| 2,142,711 | Birch | Jan. 3, 1939 |
| 2,692,063 | Ketchpel | Oct. 19, 1954 |